No. 656,798. Patented Aug. 28, 1900.
C. A. WILEY.
PHOTOGRAPHIC CAMERA.
(Application filed Aug. 5, 1899.)
(No Model.)
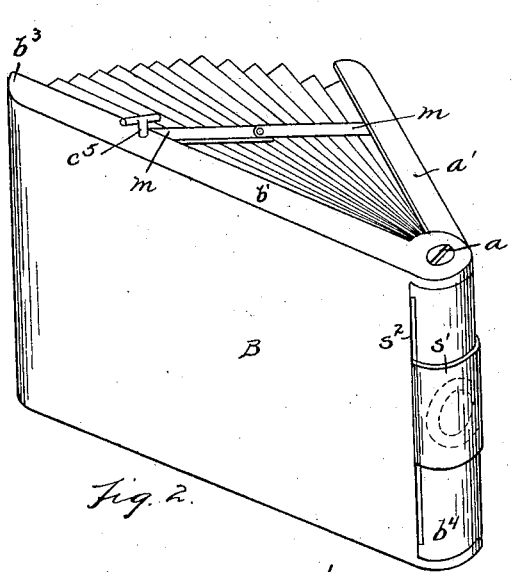
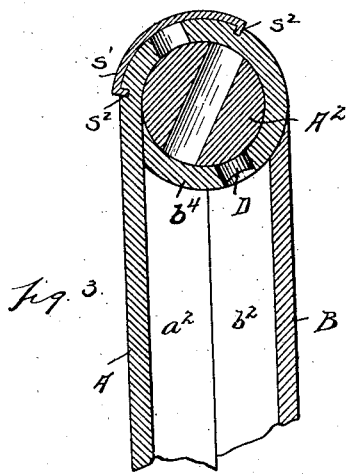
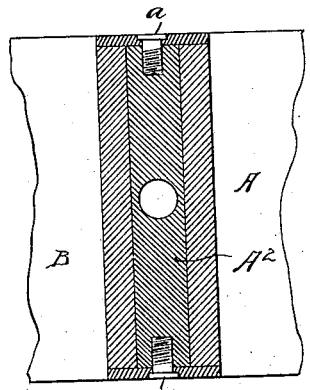
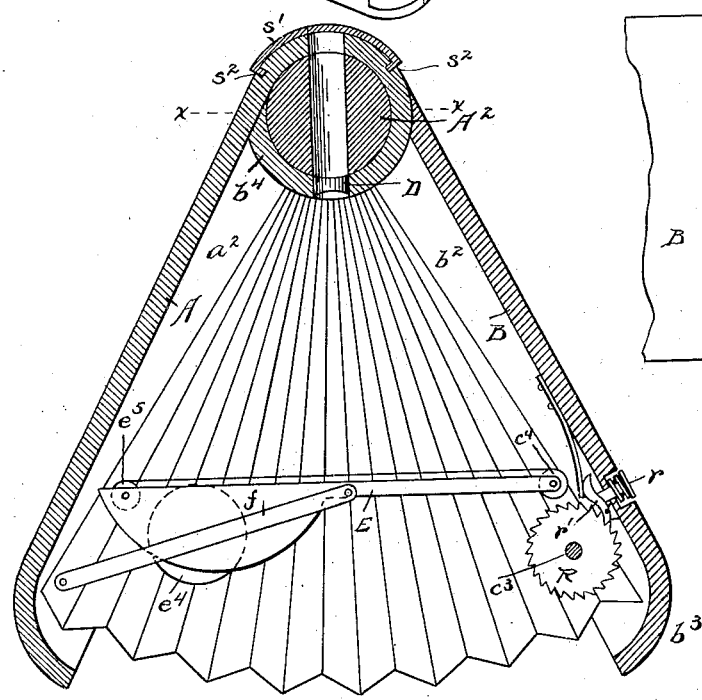
WITNESSES
Chas. E. Weaver
May E. Kott
INVENTOR
Charles A. Wiley.
By Parker & Burton
Attorneys.

UNITED STATES PATENT OFFICE.

CHARLES A. WILEY, OF MILES CITY, MONTANA.

PHOTOGRAPHIC CAMERA.

SPECIFICATION forming part of Letters Patent No. 656,798, dated August 28, 1900.

Application filed August 5, 1899. Serial No. 726,281. (No model.)

*To all whom it may concern:*

Be it known that I, CHARLES A. WILEY, a citizen of the United States, residing at Miles City, county of Custer, State of Montana, have invented a certain new and useful Improvement in Cameras; and I declare the following to be a full, clear, and exact description of the same, such as will enable others skilled in the art to which it pertains to make and use the same, reference being had to the accompanying drawings, which form a part of this specification.

My invention relates to photographic cameras, and has for its object an improved camera adapted to be folded to small compass for transportation and to be expanded or distended to such a size that it affords room for a film of comparatively-large size, so located with respect to the lens that a picture may be taken of unusually-large size as compared with the dimensions of the folded camera.

The camera in its folded condition has the shape and appearance of a thin box having two flat and two rounded edges hinged at one of the thin rounded edges and opening along a line in the middle of the thin edge at its opposite end, so that when distended it is wedge-shaped, with the lens at the thin edge of the wedge and with the blunt end of the wedge and the two triangular ends composed of cloth or other proper material folded with bellows folds.

I show and describe a camera in which negatives may be made on a film. A strip of film sufficient for a number of negatives is primarily wound on a roller that is made fast to one of the sides of the camera or to a swinging frame pivoted in one-half of the case, and after exposure the film is stored on another roller, and the second roller is made fast to the other side of the camera-case or to a frame that is secured in that side. There is employed a lens properly mounted upon the axis upon which the camera-box opens and so fixed with respect to one of the sides of the camera-box that upon distending the box fully the lens is brought to focus in a line which bisects the angle between the two sides of the distended case, and consequently is in proper position to be properly focused upon that part of the film which is now stretched across between the free ends of the camera-case and protected from light by the casing and the bellows-curtain, which forms part of the inclosure. When the sides of the camera-case close, the lens is turned so that its focal line now passes out through the side of the case, and the film contained in the case is protected not only by the ordinary shutter and the several curtains or septa which are interposed, but also by the fact that any light which may reach the lens will be directed away from the meeting lines of the septa employed in the camera.

In the drawings, Figure 1 is a plan view of the expanded camera. The location and position of the lens are indicated, as are also the location and the position of the spools. Fig. 2 is a perspective of the open camera. Fig. 3 is a horizontal section through the hinge end of the camera, the bellows fold being omitted. Fig. 4 is a vertical section on the line $x\ x$, Fig. 1.

A and B indicate the two sides of the case, which are preferably made of some stiff material, and each of the halves consists of a box-like structure bounded by five inclosing walls. The largest of these walls forms the sides of the camera. The bottom wall $b^2$ and the top wall $b'$ form, respectively, the half of the bottom and top of the camera-case. The bottom $a^2$ and the top wall $a'$ form, respectively, the other half of the bottom and top of the camera-case. The rounded end wall $b^3$ forms the half of the rear of the case. At the opposite end the rounded end wall $b^4$ of the half-case B is extended beyond the free edge of the wall $b'$ and $b^2$ and is bent in the form of a cylinder. The box A has no corresponding end wall, but is made to engage closely and so as to be light-proof against the outer face of the cylinder, which terminates this part of the box B. The engaging ends of both halves of the case are provided with knuckle pieces or lobes, through which the axis-pins $a$ and $d$ engage, this joint being a form of the well-known rule in which, however, the middle knuckle is hollow and has an opening on that side of it which lies to the interior of the case. Within said middle knuckle is a cylindrical post $A^2$, which is rigidly connected to the knuckles of the side A.

In the opening is located the lens D. The lens D is so placed that its focal axis will bisect the angular opening between the two halves of the case when the case is expanded. The lens D is fixed in position with respect to the half-case B, and when the case is folded together the focal axis of the lens lies diagonally across the case. In front of the lens D is a slide $s'$, that engages in grooves $s^2$ at the sides of the post and can be raised or lowered. The slide $s'$ may be arranged to be actuated by air-pressure.

The two halves of the case are connected by bellows-curtains, which form the top and bottom walls between the two edges of the case and the rear wall between the two edges of the case. A pair of links $m$ $m$ are hinged to the case outside of the flexible part of it and serve as links to prevent the too great expansion of the case and as a brace to hold the sides of the case in place when exposed. The braces fold into the case when the case is closed.

$C^3$ and $C^4$ are storage-spools. The storage-spool $C^3$ has a ratchet-wheel R at one end of it. With the ratchet-wheel R engages a pawl $r'$, which may be actuated from the outside of the case by means of a pressure-pin $r$. The ratchet-wheel R and its pawl prevent the film from being wound back from the storage-spool $c$ unless the pawl $r'$ is purposely disengaged from the ratchet-wheel R. The storage-spool $C^3$ is fixed to the case B, and the storage-spool $C^4$ is fixed to an arm E, that is hinged to the case B and swings into that half of the case. When the camera closes together, the arm E is linked to the half-case A by a link $f$, that serves to pull it to position when the case is expanded. In this form of construction the film passes from the feed-spool $C^1$ around the guide-roller $e^5$ on the free end of the arm E, thence along the length of the arm E and around a guide-roller $c^4$, and thence to a storage-spool $C^3$. The storage-spool is actuated by the hand-bar $c^5$.

What I claim is—

1. A camera comprising hinged sides, a portion of a cylinder secured to one of said sides at the hinge, said cylinder having an aperture for the lens extending through said cylinder approximately at right angles to the axis thereof, said aperture being so located as to approximately bisect the angle between said sides when the camera is open, and so that it shall be closed by the other of said sides when the camera is closed, substantially as described.

2. A camera comprising hinged sides, one of said sides being extended and curved to form a portion of a cylinder at the hinge, and having an aperture for the lens extending through said cylinder approximately at right angles to the axis thereof, said aperture being so located as to approximately bisect the angle between said sides when the camera is open, and so that it shall be closed by the other of said sides when the camera is closed, substantially as described.

3. A camera comprising hinged sides, a portion of a cylinder secured to one of said sides at the hinge and having an aperture for the lens extending through said cylinder approximately at right angles to the axis thereof, said aperture being so located as to approximately bisect the angle between said sides when the camera is open, and so that it shall be closed by the other of said sides when the camera is closed, and a shutter formed to fit on the surface of said cylinder and to slide longitudinally thereon, substantially as described.

In testimony whereof I sign this specification in the presence of two witnesses.

CHARLES A. WILEY.

Witnesses:
M. E. KOTT,
JOHN N. GOODRICH.